(12) United States Patent
Kasami et al.

(10) Patent No.: US 7,272,372 B2
(45) Date of Patent: Sep. 18, 2007

(54) DIVERSITY ANTENNA APPARATUS AND DIVERSITY ANTENNA CONTROL METHOD

(75) Inventors: Hideo Kasami, Kanagawa-Ken (JP); Kazumi Sato, Kanagawa-Ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 278 days.

(21) Appl. No.: 10/968,965

(22) Filed: Oct. 21, 2004

(65) Prior Publication Data

US 2005/0113038 A1    May 26, 2005

(30) Foreign Application Priority Data

Oct. 23, 2003  (JP) .............................. 2003-363271

(51) Int. Cl.
*H04B 1/06* (2006.01)

(52) U.S. Cl. .............................. 455/277.2; 455/277.1; 455/101; 455/272; 455/132; 455/135; 455/140; 375/347; 342/374

(58) Field of Classification Search ................ 455/130, 455/132–140, 272–275, 276.1, 277.1, 277.2, 455/101, 334; 375/347; 342/374
See application file for complete search history.

(56) References Cited

U.S. PATENT DOCUMENTS

| 5,541,963 | A | * | 7/1996 | Nakagoshi ................. 375/347 |
| 5,805,643 | A | * | 9/1998 | Seki et al. .................. 375/347 |
| 6,029,057 | A | * | 2/2000 | Paatelma et al. ......... 455/277.2 |
| 6,839,550 | B2 | * | 1/2005 | Iguchi et al. ............. 455/277.1 |
| 6,867,819 | B2 | * | 3/2005 | Lee ............................. 348/725 |
| 7,035,612 | B2 | * | 4/2006 | Kishimoto et al. ...... 455/277.1 |
| 7,221,963 | B2 | * | 5/2007 | Ishihara et al. .......... 455/562.1 |
| 2002/0149517 | A1 | * | 10/2002 | Iguchi et al. ................ 342/374 |
| 2002/0164968 | A1 | * | 11/2002 | Crawford ................. 455/277.1 |
| 2003/0228857 | A1 | * | 12/2003 | Maeki ...................... 455/278.1 |

FOREIGN PATENT DOCUMENTS

| JP | 6-188793 | 7/1994 |
| JP | 9-214409 | 8/1997 |
| JP | 9-326739 | 12/1997 |
| JP | 11-68631 | 3/1999 |
| JP | 2002-314469 | 10/2002 |
| JP | 2003-134013 | 5/2003 |

* cited by examiner

*Primary Examiner*—Edan Orgad
*Assistant Examiner*—Junpeng Chen
(74) *Attorney, Agent, or Firm*—Oblon, Spivak, McClelland, Maier & Neustadt, P.C.

(57) ABSTRACT

A diversity antenna apparatus has N (N is 3 or more integer) elements of antennas which receive radio signals, a priority storage unit configured to store priority data of the N elements of antennas, a first antenna selector which selects two antennas from among the N elements of antennas based on the priority data, a second antenna selector which selects one of the selected two antennas based on a prescribed condition, and a priority update unit configured to update priority data of the N elements of antennas stored in the priority storage unit based on the antenna selected by the second antenna selector.

5 Claims, 17 Drawing Sheets

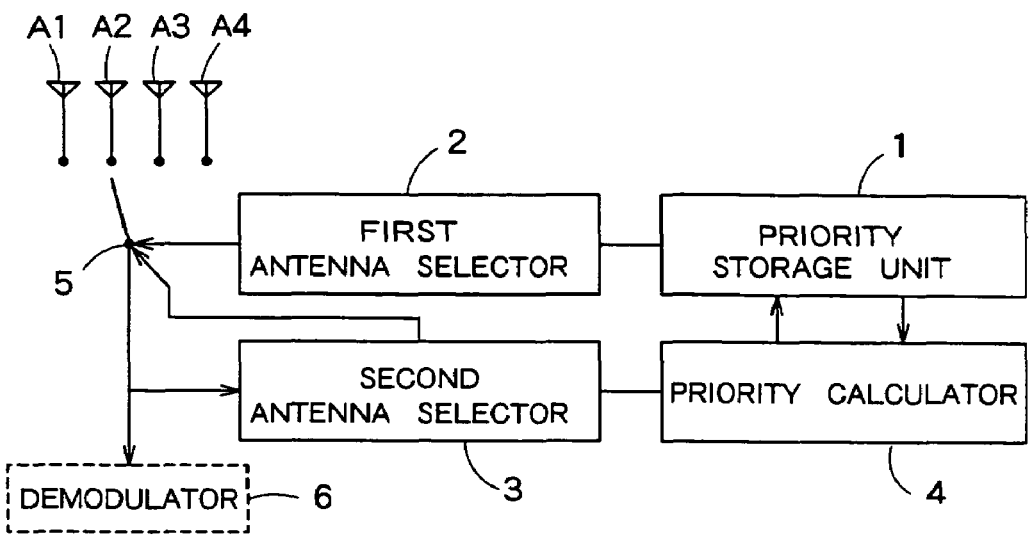
FIG. 1
| ANTENNA | A1 | A2 | A3 | A4 |
|---|---|---|---|---|
| STATE | S1 | S2 | S3 | S4 |
|  | 3 | 1 | 4 | 2 |
FIG. 2
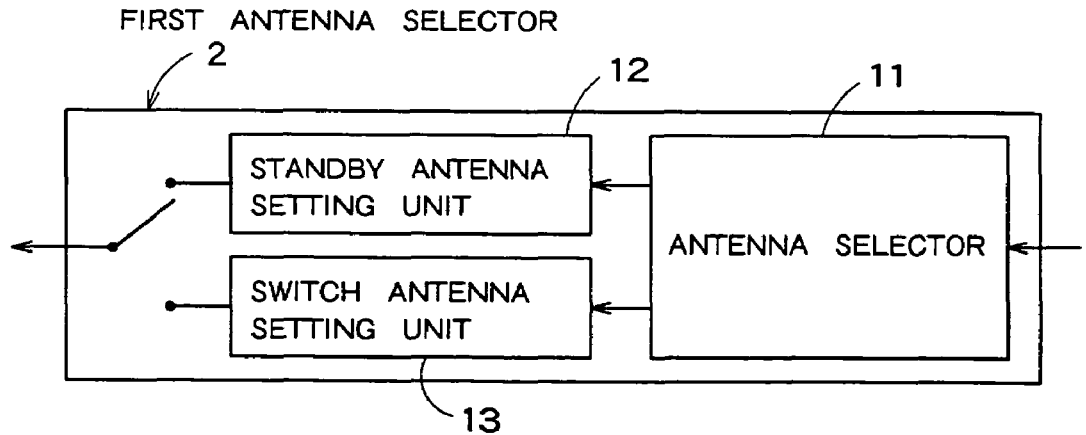
FIG. 3

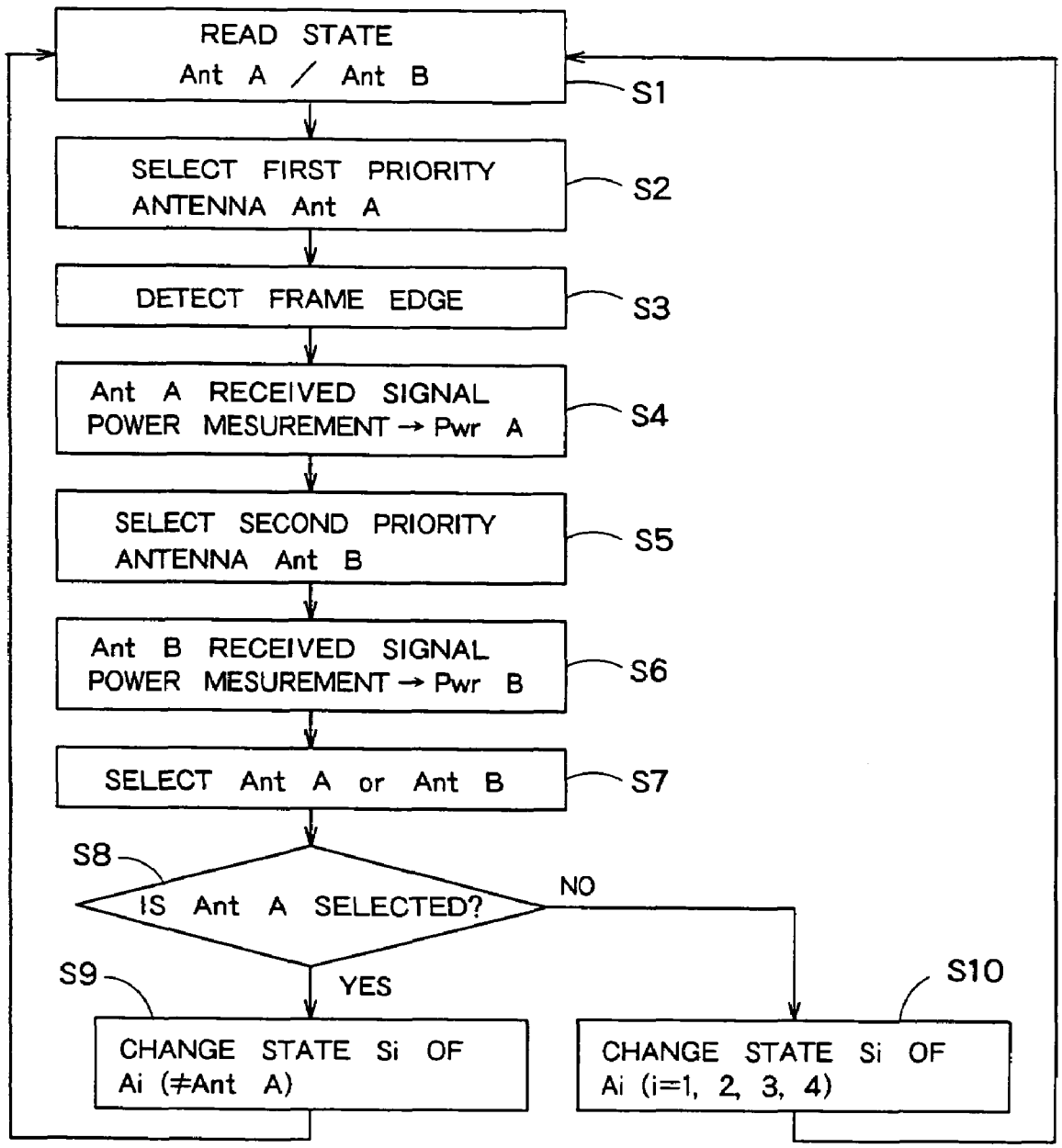
F I G. 6

UPDATE OF STATE Si OF Ai (≠Ant A)
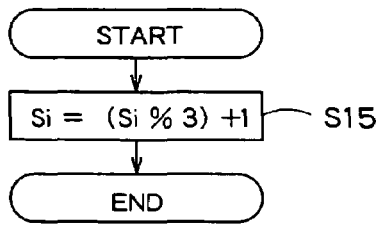
FIG. 7
UPDATE OF STATE Si OF Ai (i=1, 2, 3, 4)
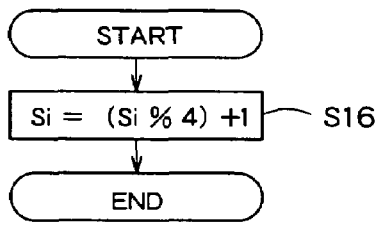
FIG. 8
| INITIAL STATE | | | | Ant A | Ant B | WAS FRAME RECEIVED TO THE END? | SELECTION RESULT | IS STATE CHANGED? | THE LAST STATE | | | |
|---|---|---|---|---|---|---|---|---|---|---|---|---|
| A1 | A2 | A3 | A4 | | | | | | | | | |
| 4 | 3 | 2 | 1 | A1 | A2 | y | A1 | y | 4 | 1 | 3 | 2 |
| 4 | 1 | 3 | 2 | A1 | A3 | y | A3 | y | 1 | 2 | 4 | 3 |
| 1 | 2 | 4 | 3 | A3 | A4 | y | A3 | y | 2 | 3 | 4 | 1 |
| 2 | 3 | 4 | 1 | A3 | A2 | y | A2 | y | 3 | 4 | 1 | 2 |
FIG. 9

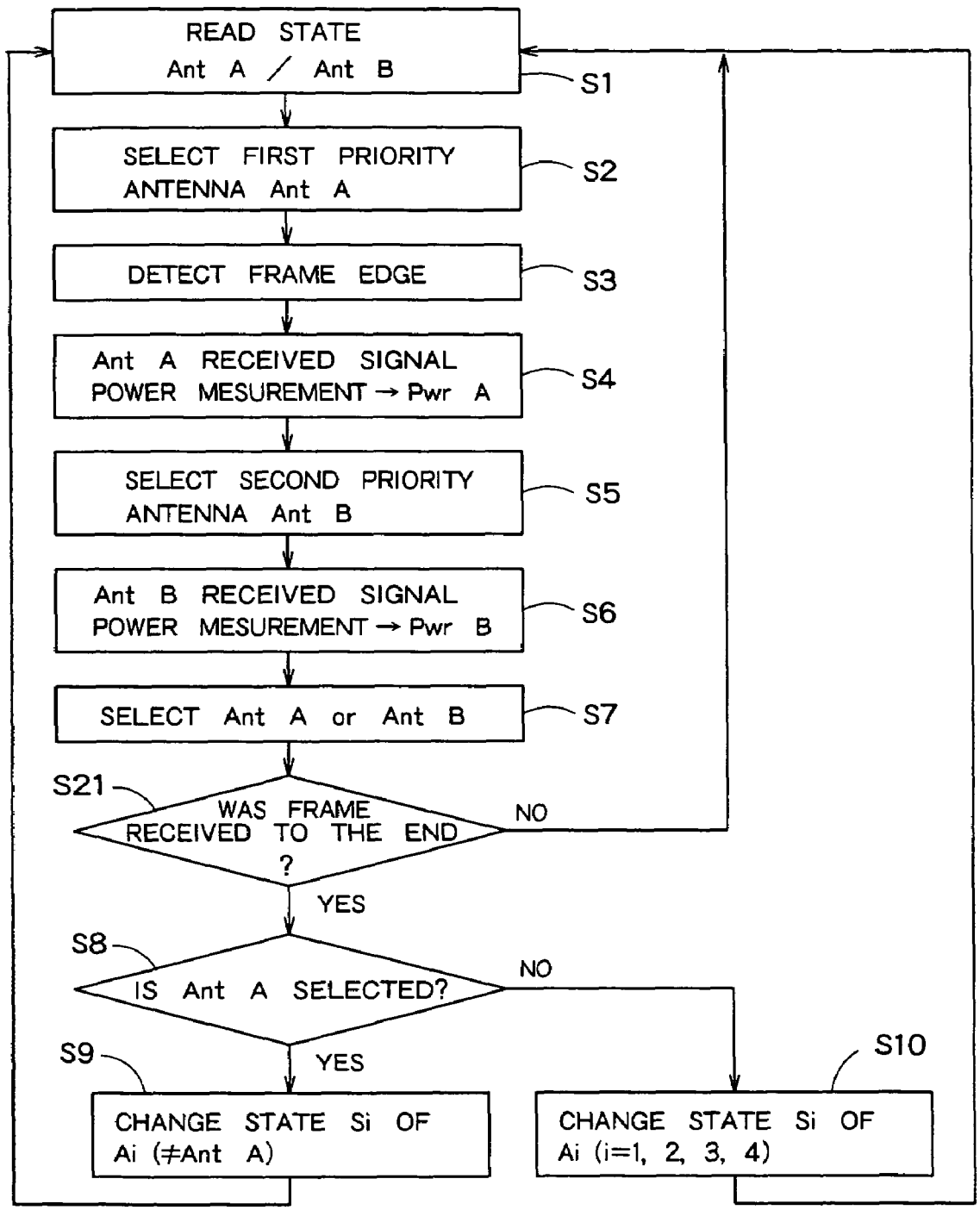
F I G. 11

| INITIAL STATE | | | | Ant A | Ant B | WAS FRAME RECEIVED TO THE END? | SELECTION RESULT | IS STATE CHANGED? | THE LAST STATE | | | |
|---|---|---|---|---|---|---|---|---|---|---|---|---|
| A1 | A2 | A3 | A4 | | | | | | | | | |
| 4 | 3 | 2 | 1 | A1 | A2 | y | A1 | y | 4 | 1 | 3 | 2 |
| 4 | 1 | 3 | 2 | A1 | A3 | y | A3 | y | 1 | 2 | 4 | 3 |
| 1 | 2 | 4 | 3 | A3 | A4 | y | A3 | y | 2 | 3 | 4 | 1 |
| 2 | 3 | 4 | 1 | A3 | A2 | y | A2 | y | 3 | 4 | 1 | 2 |
| 3 | 4 | 1 | 2 | A2 | A1 | n | – | n | 3 | 4 | 1 | 2 |
| 3 | 4 | 1 | 2 | A2 | A1 | n | – | n | 3 | 4 | 1 | 2 |

F I G. 12

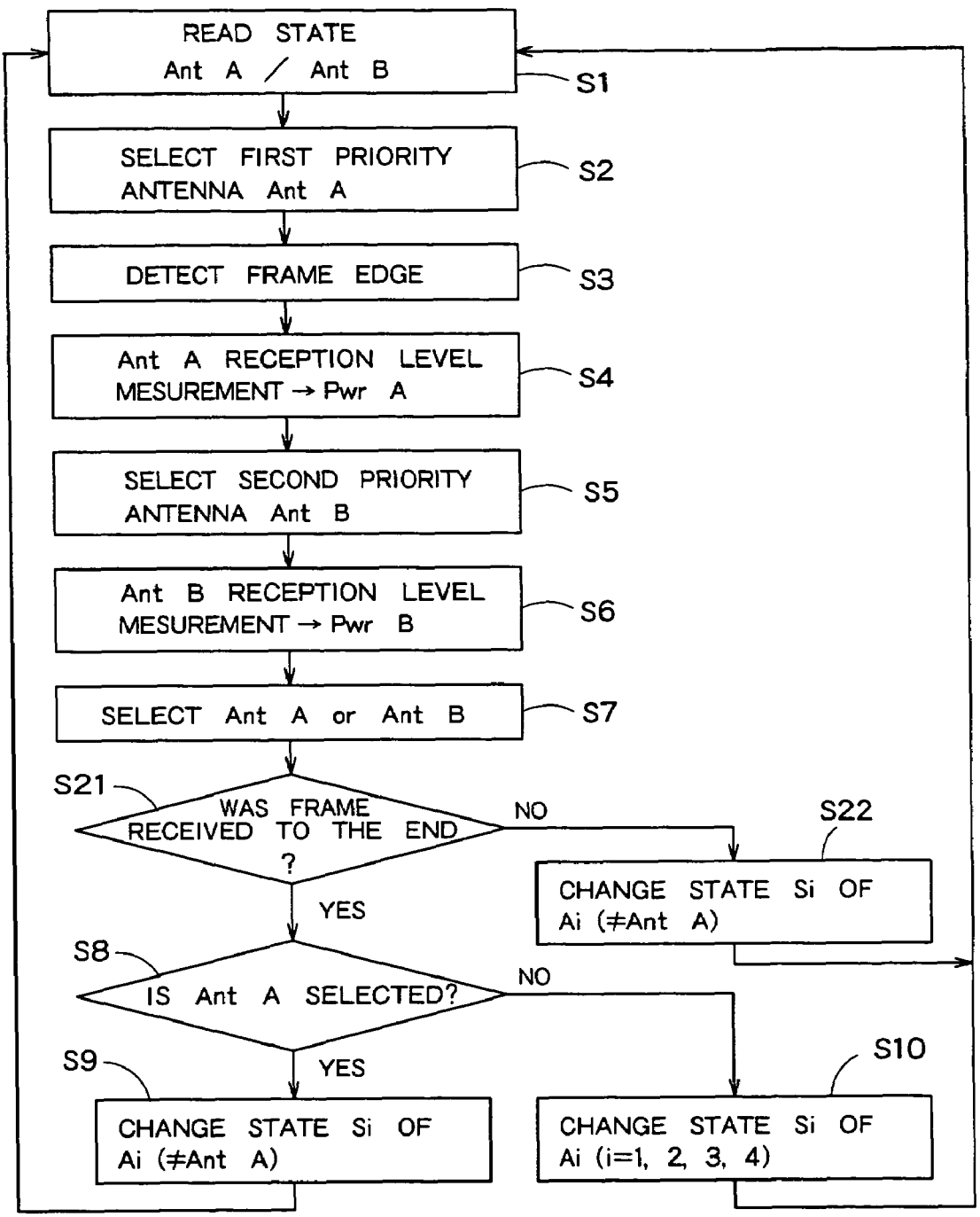
F I G. 13

| INITIAL STATE | | | | Ant A | Ant B | WAS FRAME RECEIVED TO THE END? | SELECTION RESULT | IS STATE CHANGED? | THE LAST STATE | | | |
|---|---|---|---|---|---|---|---|---|---|---|---|---|
| A1 | A2 | A3 | A4 | | | | | | | | | |
| 4 | 3 | 2 | 1 | A1 | A2 | y | A1 | y | 4 | 1 | 3 | 2 |
| 4 | 1 | 3 | 2 | A1 | A3 | y | A3 | y | 1 | 2 | 4 | 3 |
| 1 | 2 | 4 | 3 | A3 | A4 | y | A3 | y | 2 | 3 | 4 | 1 |
| 2 | 3 | 4 | 1 | A3 | A2 | y | A2 | y | 3 | 4 | 1 | 2 |
| 3 | 4 | 1 | 2 | A2 | A1 | n | – | y | 1 | 4 | 2 | 3 |
| 1 | 4 | 2 | 3 | A2 | A4 | n | – | y | 2 | 4 | 3 | 1 |
| 2 | 4 | 3 | 1 | A2 | A3 | y | A3 | y | 3 | 1 | 4 | 2 |

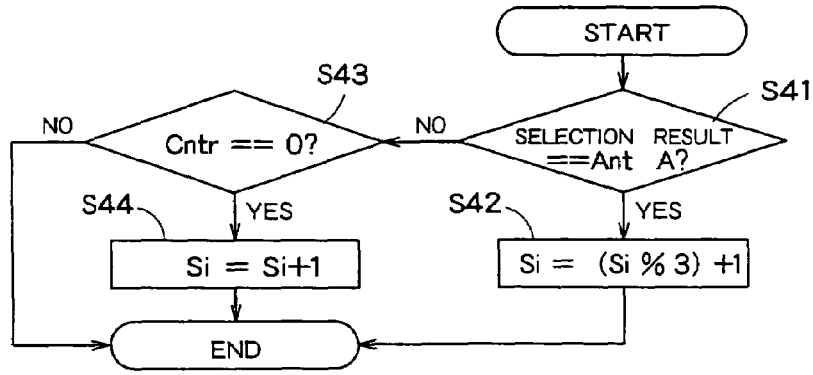
F I G. 18
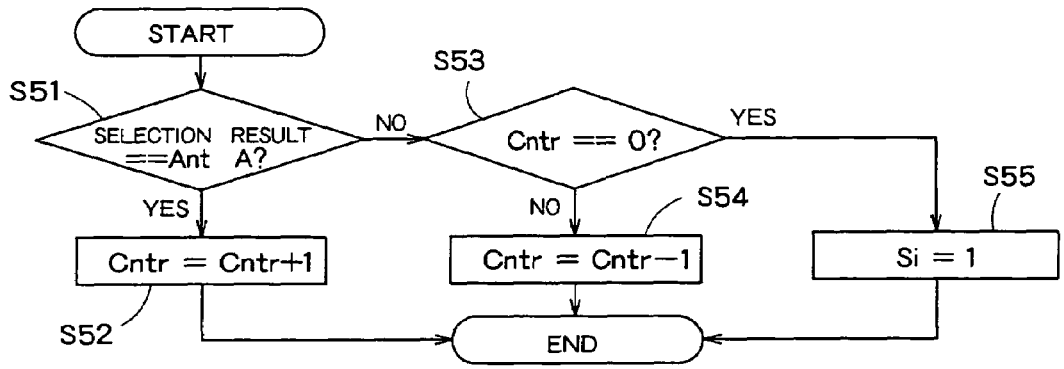
F I G. 19
| INITIAL STATE | | | | | Ant A | Ant B | WAS FRAME RECEIVED TO THE END? | SELECTION RESULT | IS STATE CHANGED? | THE LAST STATE | | | | |
|---|---|---|---|---|---|---|---|---|---|---|---|---|---|---|
| A1 | A2 | A3 | A4 | Cntr | | | | | | A1 | A2 | A3 | A4 | Cntr |
| 4 | 3 | 2 | 1 | 0 | A1 | A2 | y | A1 | y | 4 | 1 | 3 | 2 | 1 |
| 4 | 1 | 3 | 2 | 1 | A1 | A3 | y | A3 | y | 4 | 1 | 3 | 2 | 0 |
| 4 | 1 | 3 | 2 | 0 | A1 | A3 | y | A3 | y | 1 | 2 | 4 | 3 | 0 |
| 1 | 2 | 4 | 3 | 0 | A3 | A4 | y | A3 | y | 2 | 3 | 4 | 1 | 1 |
| 2 | 3 | 4 | 1 | 1 | A3 | A2 | n | – | n | 2 | 3 | 4 | 1 | 1 |
| 2 | 3 | 4 | 1 | 1 | A3 | A2 | n | – | n | 2 | 3 | 4 | 1 | 1 |
F I G. 20

| INITIAL STATE | | | | | Ant A | Ant B | WAS FRAME RECEIVED TO THE END? | SELECTION RESULT | IS STATE CHANGED? | THE LAST STATE | | | | |
|---|---|---|---|---|---|---|---|---|---|---|---|---|---|---|
| A1 | A2 | A3 | A4 | Cntr | | | | | | A1 | A2 | A3 | A4 | Cntr |
| 4 | 3 | 2 | 1 | 0 | A1 | A2 | y | A1 | y | 4 | 1 | 3 | 2 | 1 |
| 4 | 1 | 3 | 2 | 1 | A1 | A3 | y | A3 | y | 4 | 1 | 3 | 2 | 0 |
| 4 | 1 | 3 | 2 | 0 | A1 | A3 | y | A3 | y | 1 | 2 | 4 | 3 | 0 |
| 1 | 2 | 4 | 3 | 0 | A3 | A4 | y | A3 | y | 2 | 3 | 4 | 1 | 1 |
| 2 | 3 | 4 | 1 | 1 | A3 | A2 | n | – | y | 3 | 1 | 4 | 2 | 1 |
| 3 | 1 | 4 | 2 | 1 | A3 | A1 | n | – | y | 1 | 2 | 4 | 3 | 1 |
F I G. 22
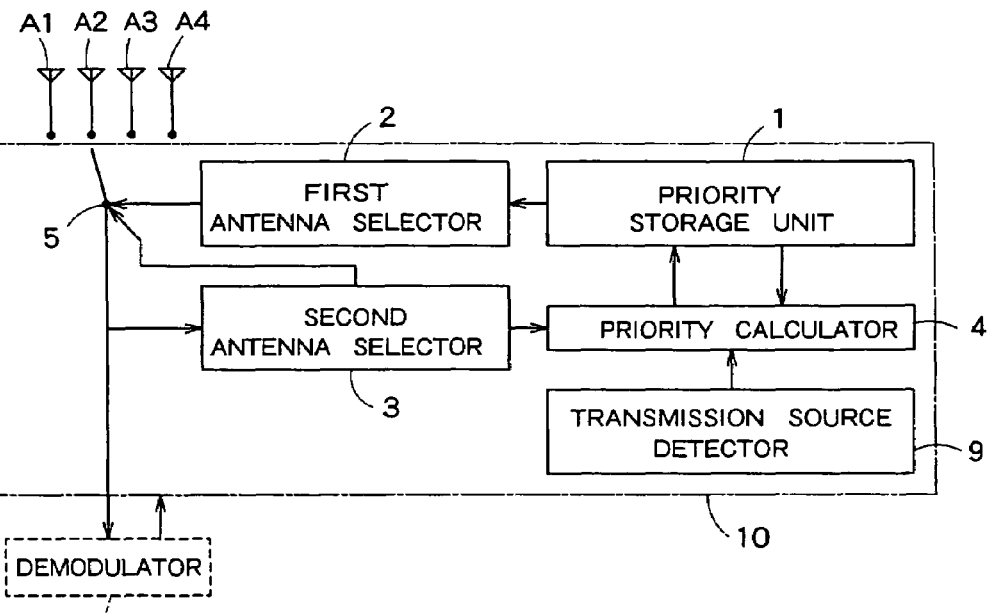
F I G. 23
F I G. 24

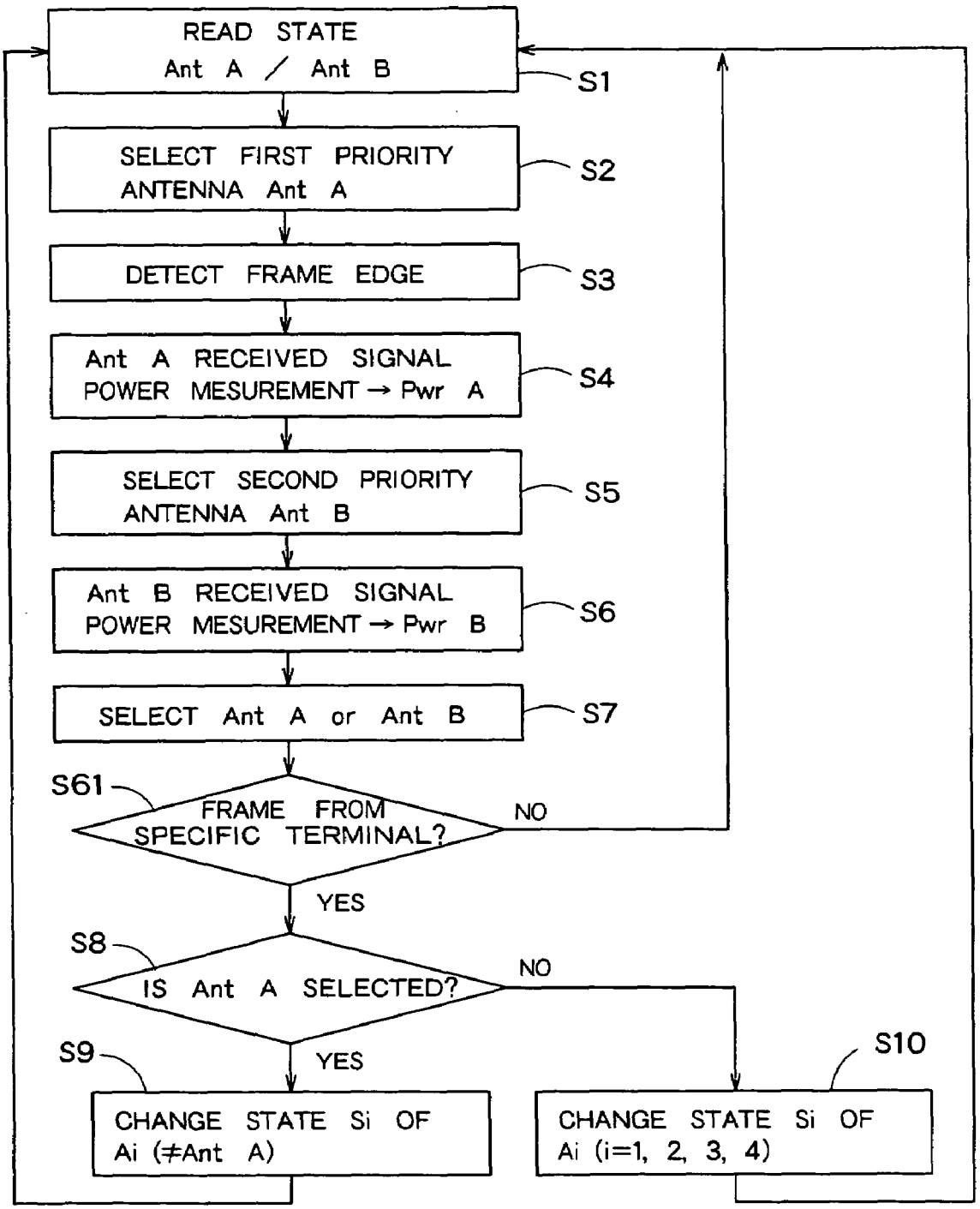
F I G. 25

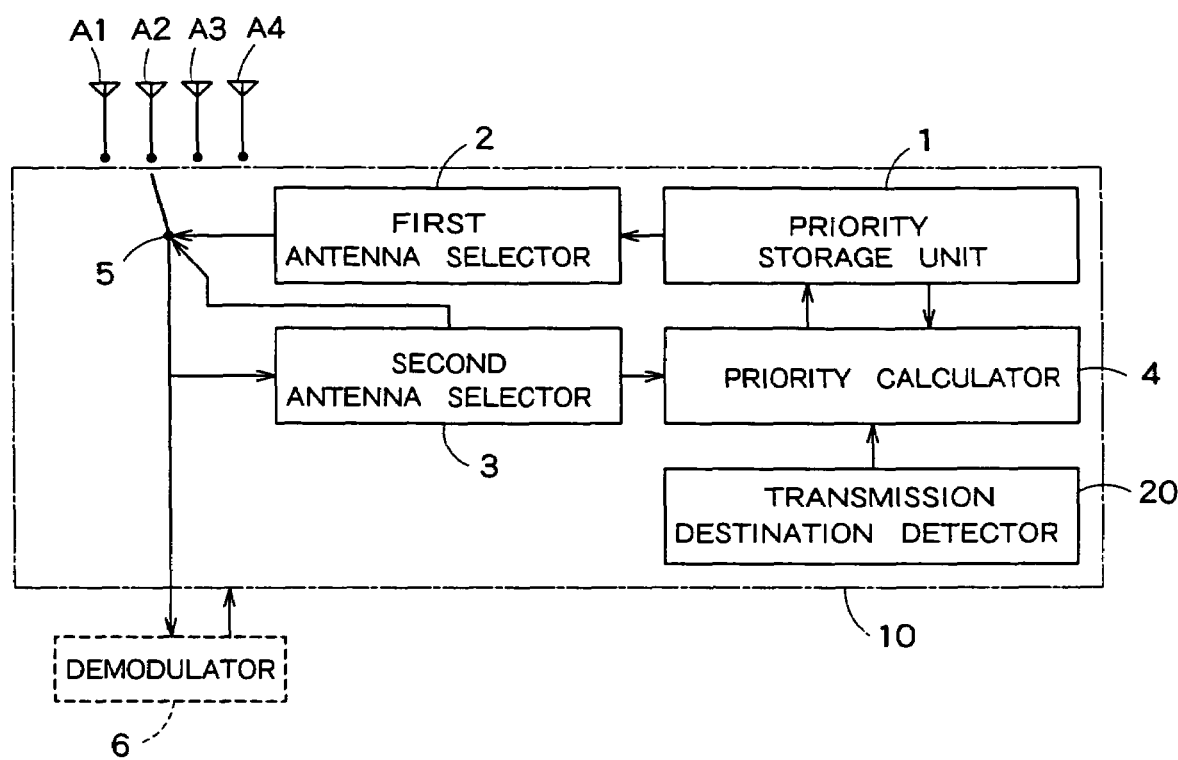
F I G. 26

DIVERSITY ANTENNA APPARATUS AND DIVERSITY ANTENNA CONTROL METHOD

CROSS REFERENCE TO RELATED APPLICATIONS

This application claims benefit of priority under 35USC§119 to Japanese Patent Application No. 2003-363271, filed on Oct. 23, 2003, the entire contents of which are incorporated by reference herein.

BACKGROUND OF THE INVENTION

1. Field of the Invention

The present invention relates to a diversity antenna apparatus and a diversity antenna control method for selecting a desirable antenna from among a plurality of antennas to receive a radio signal. Particularly, the present invention relates to a multiple elements antenna diversity technique in the channel condition which varies slowly.

2. Related Art

In a frame reception processing according to a conventional wireless local area network (LAN) communication system (for example, in IEEE802.11), a length of a preamble added in front of data is set by assuming a diversity of two elements (IEEE 802.11a, for example).

However, according to a conventional practice, when the number of diversity branches is set to N (N is an integer equal to or larger than 3), one branch is selected from among the N branches during a period of preamble that assumes two branches. Consequently, it is impossible to select a suitable branch, thereby degrading reception characteristic.

With increase of the number of branches, a period of preamble required for selecting a branch becomes long. Therefore, a period of preamble to be used for other processing such as synchronous processing becomes short, degrading the reception characteristic.

SUMMARY OF THE INVENTION

The present invention provides an antenna diversity apparatus and an antenna diversity method capable of suitably selecting a branch from among many branches at a short time.

A diversity antenna apparatus according to one embodiment of the present invention, comprising:

N (N is 3 or more integer) elements of antennas which receive radio signals;

a priority storage unit configured to store priority data of said N elements of antennas;

a first antenna selector which selects two antennas from among said N elements of antennas based on the priority data;

a second antenna selector which selects one of the selected two antennas based on a prescribed condition; and a priority update unit configured to update priority data of said N elements of antennas stored in said priority storage unit based on the antenna selected by said second antenna selector.

Furthermore, a diversity antenna apparatus according to one embodiment, comprising:

a plurality of control apparatuses, each having N elements of antennas, and receiving a radio signal by selecting one of the corresponding N elements of antennas; and a combining unit configured to combine the radio signals received by said plurality of control apparatuses, wherein each of said plurality of control apparatuses includes:

a priority storage unit configured to store priority data of the corresponding N elements of antennas;

a first antenna selector which selects two antennas from among said N elements of antennas based on the priority data;

a second antenna selector which selects either of the selected two antennas based on a prescribed condition; and a priority update unit which updates the priority data of said N elements of antennas stored in said priority storage unit based on the antenna selected by said second antenna selector.

BRIEF DESCRIPTION OF THE DRAWINGS

FIG. 1 is a block diagram showing a schematic configuration of a diversity antenna apparatus 10 according to a first embodiment of the present invention.

FIG. 2 is a table showing one example of contents stored in the priority storage unit 1.

FIG. 3 is a block diagram showing one example of an internal configuration of the first antenna selector 2.

FIG. 6 is a flowchart showing one example of processing operation carried out by the diversity antenna apparatus 10 shown in FIG. 1.

FIG. 7 is a flowchart showing detailed contents of the processing at step S9 shown in FIG. 6.

FIG. 8 is a flowchart showing detailed contents of the processing at step S10 shown in FIG. 6.

FIG. 9 is a table showing a state that the last states of the antennas A1 to A4 change in accordance with the initial states of these antennas.

FIG. 11 is a flowchart showing one example of processing operation carried out by the diversity antenna apparatus 10 shown in FIG. 10.

FIG. 12 is a table showing a state that the last states of the antennas A1 to A4 change corresponding to the initial states of these antennas.

FIG. 13 is a flowchart showing one example of processing operation carried out by the diversity antenna apparatus 10 according to the third embodiment.

FIG. 18 is a flowchart showing detailed contents of the processing at step S31 shown in FIG. 17.

FIG. 19 is a flowchart showing one example of the processing at step S32 shown in FIG. 17.

FIG. 20 is a table showing a state that the last states of the antennas A1 to A4 change corresponding to the initial states of these antennas.

FIG. 22 is a table showing a state that the last states of the antennas A1 to A4 change corresponding to the initial states of these antennas.

FIG. 23 is a block diagram showing a schematic configuration of the diversity antenna apparatus 10 according to a sixth embodiment of the present invention.

FIG. 24 is one example of a frame configuration of a reception signal that is received by an antenna.

FIG. 25 is a flowchart of one example of processing operation carried out by the diversity antenna apparatus 10 according to the sixth embodiment.

FIG. 26 is a block diagram showing a schematic configuration of the diversity antenna apparatus 10 according to a seventh embodiment of the present invention.

DETAILED DESCRIPTION OF THE INVENTION

Figure 4:
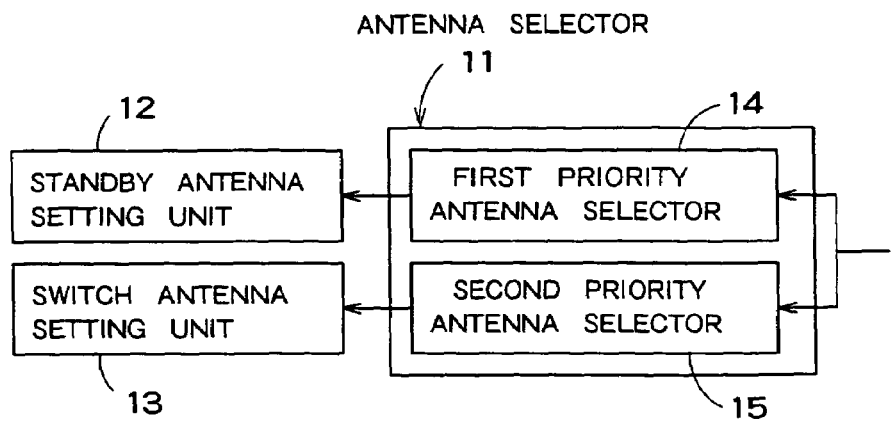
FIG. 4 is a block diagram showing one example of an internal configuration of the first & second priority antenna selector 11 shown in FIG. 3.

Hereafter, a diversity antenna apparatus and a diversity antenna control method according to one embodiment of the present invention will be described more specifically with reference to the drawings.

FIRST EMBODIMENT

FIG. 1 is a block diagram showing a schematic configuration of a diversity antenna apparatus 10 according to a first embodiment of the present invention. Although only a configuration of a receiving apparatus that receives a radio signal is illustrated in FIG. 1, a transmitting apparatus that transmits a radio signal can be also provided. Although four antennas are used for diversity in the example shown in FIG. 1, there is no particular limit to the number of antennas as long as three or more antennas are used.

The diversity antenna apparatus 10 shown in FIG. 1 includes a plurality of antennas A1 to A4 corresponding to the number of branches N=4, a priority storage unit 1 that stores priority data of the antennas A1 to A4, a first antenna selector 2 that selects two antennas from among the antennas A1 to A4 based on priority data, a second antenna selector 3 that selects one antenna out of the selected two antennas, a priority calculator 4 that updates the priority data of the antennas A1 to A4 that are stored in the priority storage unit 1 based on a result of the selection by the second antenna selector 3, and a switch 5 that switches the antennas A1 to A4 based on results of the selections by the first and the second antenna selectors 2 and 3. The switch 5 selects one of radio signals received by the antennas A1 to A4, and transfers this signal to a demodulator 6. The demodulator 6 demodulates this signal.

The demodulator 6 detects a frame edge from a reception signal received by an antenna, demodulates the reception signal using this frame edge as a starting point, and instructs the diversity antenna apparatus 10 to start an antenna selection operation.

The second antenna selector 3 detects received signal power of the antennas A1 to A4, and selects an antenna having high received signal power, as described later.

FIG. 2 is a table showing one example of contents stored in the priority storage unit 1. As shown in FIG. 2, the storage unit 1 stores values (i.e., states) indicating priorities of the antennas. Larger states indicate higher priorities. The antenna A3 has a highest priority, the antenna A1 has the second high priority, and the antenna A4 has the third high priority, with the antenna A2 having a lowest priority.

FIG. 3 is a block diagram showing one example of an internal configuration of the first antenna selector 2. The first antenna selector 2 shown in FIG. 3 has a first & second priority antenna selector 11 that selects a first priority antenna and a second priority antenna, a standby antenna setting unit 12 that sets one of antennas selected by the first & second priority antenna selector 11 as a standby antenna, and a switch antenna setting unit 13 that sets the other antenna selected by the first & second priority antenna selector 11 as a switch antenna.

FIG. 4 is a block diagram showing one example of an internal configuration of the first & second priority antenna selector 11 shown in FIG. 3. The first & second priority antenna selector 11 shown in FIG. 4 has a first priority antenna selector 14 that selects a first priority antenna, and a second priority antenna selector 15 that selects a second priority antenna. The standby antenna setting unit 12 sets the first priority antenna selected by the first priority antenna selector 14 as a standby antenna. The switch antenna setting unit 13 sets the second priority antenna selected by the second priority antenna selector 15 as a switch antenna.

Figure 5:
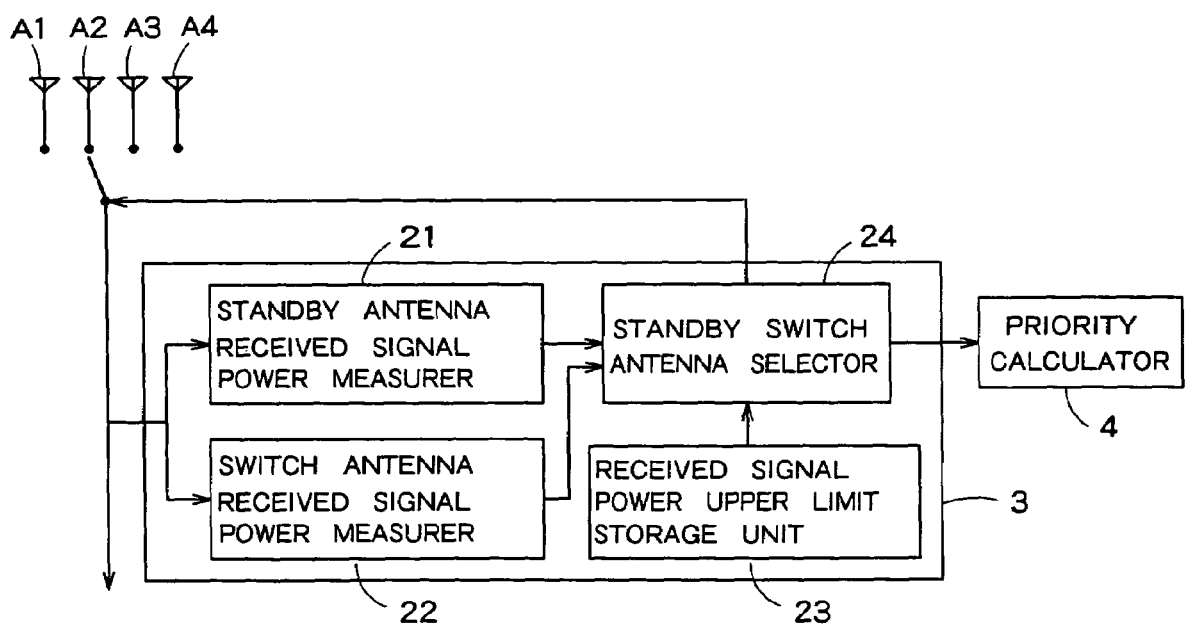
FIG. 5 is a block diagram showing one example of an internal configuration of the second antenna selector 3.

FIG. 5 is a block diagram showing one example of an internal configuration of the second antenna selector 3. The second antenna selector 3 shown in FIG. 5 has a standby antenna received signal power measurer 21 that measures received signal power of a standby antenna, a switch antenna received signal power measurer 22 that measures received signal power of a switch antenna, a received signal power upper limit storage unit 23 that stores an upper limit of received signal power that can be demodulated by the demodulator 6, and a standby switch antenna selector 24 that selects any one of a reception antenna and a switch antenna based on an upper limit of received signal power. The standby switch antenna selector 24 selects either a standby antenna or a switch antenna, which does not exceed an upper limit of received signal power and has stronger received signal power.

FIG. 6 is a flowchart showing one example of processing operation carried out by the diversity antenna apparatus 10 shown in FIG. 1. The first antenna selector 2 reads priority data (i.e., states) stored in the priority storage unit 1 (step S1), selects a first priority antenna (i.e., the antenna A3, in the example shown in FIG. 2) as a standby antenna AntA, and selects a second priority antenna (i.e., the antenna A1, in the example shown in FIG. 2) as a switch antenna AntB (step S2).

The switch 5 selects the standby antenna AntA, and becomes a frame waiting state. After that, when a frame edge is detected (step S3), the second antenna selector 3 measures received signal power PwrA of the standby antenna AntA (step S4).

The switch 5 selects the switch antenna AntB (step S5), and the second antenna selector 3 measures the received signal power PwrB of the switch antenna AntB (step S6).

The second antenna selector 3 selects either the standby antenna AntA or the switch antenna AntB, which does not exceed an upper limit of received signal power and has stronger received signal power (step S7).

When the standby antenna AntA is selected, the priority calculator 4 updates contents of the priority of at least one antenna other than a first priority antenna (steps S8 and S9). For example, the priority calculator 4 does not change the priority of a first priority antenna (i.e., the antenna A3, in the example shown in FIG. 2), sets the priority of a second priority antenna (i.e., the antenna A1, in the example shown in FIG. 2) to the lowest priority, and raises the priorities of the rest of antennas (i.e., the antennas A2 and A4) by one level, respectively.

On the other hand, when the switch antenna AntB is selected, the priority calculator 4 sets the priority of at least a second priority antenna to the first priority or the second priority. For example, the priority calculator 4 sets the priority of a first priority antenna (i.e., the antenna A3, in the example shown in FIG. 2) to the lowest priority, and raises the priorities of the remaining antennas (i.e., the antennas A1, A2 and A4) by one level respectively (steps S8 and S10).

FIG. 7 is a flowchart showing detailed contents of the processing at step S9 shown in FIG. 6. As shown in FIG. 7, when the standby antenna AntA is selected, processing adding "1" to a surplus obtained by dividing state Si by "3", i.e. "(Si % 3)+1", is carried out (step S15). With this processing, the priority of the second priority antenna becomes the lowest, and the priorities of the remaining the antennas are raised by one level respectively.

FIG. 8 is a flowchart showing detailed contents of the processing at step S10 shown in FIG. 6. As shown in FIG. 8, when the standby antenna AntB is selected, processing adding "1" to a surplus obtained by dividing state Si by "4", i.e. "(Si % 4)+1", is carried out (step S16). By this processing, the priority of the first priority antenna becomes the lowest, and the priorities of the remaining antennas are raised by one level, respectively.

FIG. 9 is a table showing a state that the last states of the antennas A1 to A4 change in accordance with the initial states of these antennas. For example, when the initial states of the antennas A1 to A4 are 4, 3, 2, and 1, respectively, a standby antenna is the antenna A1, and a switch antenna is the antenna A2. When the second antenna selector 3 selects the antenna A1, the last states of the antennas become 4, 1, 3, and 2, respectively. When the initial states of the antennas A1 to A4 are 4, 1, 3, and 2, respectively, a standby antenna is the antenna A1, and a switch antenna is the antenna A3. When the second antenna selector 3 selects the antenna A3, the last states of the antennas become 1, 2, 4 and 3, respectively. When the initial states of the antennas A1 to A4 are 1, 2, 4 and 3, respectively, a standby antenna is the antenna A3, and a switch antenna is the antenna A4. When the second antenna selector 3 selects the antenna A3, the last states of the antennas become 2, 3, 4 and 1, respectively. When the initial states of the antennas A1 to A4 are 2, 3, 4 and 1, respectively, a standby antenna is the antenna A3, and a switch antenna is the antenna A2. When the second antenna selector 3 selects the antenna A2, the last states of the antennas become 3, 4, 1 and 2, respectively.

As explained above, according to the first embodiment, priorities are given to the antennas A1 to A4. The first antenna selector 2 selects two antennas based on these priorities. The second antenna selector 3 selects one of the two selected antennas. Therefore, various antennas can be selected based on the contents selected by the first and the second antenna selectors 2 and 3. Accordingly, when there are three or more antennas, an optimum antenna can be selected from among these antennas.

Because a first priority antenna is set as a standby antenna at the initial state, a success rate of a detection of a frame edge can be improved.

Because the second antenna selector 3 selects an antenna of which received signal power does not exceed a predetermined upper limit, a reception signal of a wireless receiver is not saturated even if a distance between communication apparatuses is very short. Therefore, a signal-to-noise (S/N) ratio can be improved.

When the second antenna selector 3 selects a first priority antenna, the priority calculator 4 updates the priority data of antennas other than this antenna. Therefore, the first priority antenna is always supplied to the second antenna selector 3, and possibility that this antenna is selected becomes high. Therefore, as long as propagation environment does not fluctuate largely, it is possible to raise reception success probability.

When the second antenna selector 3 selects a second priority antenna, the priority calculator 4 sets the priority of this antenna to the first priority. Because of this, a possibility that the second antenna selector 3 selects this antenna at the next frame reception time becomes high, and as long as propagation environment does not fluctuate largely, it is possible to raise reception success probability.

SECOND ENVIRONMENT

Figure 10:
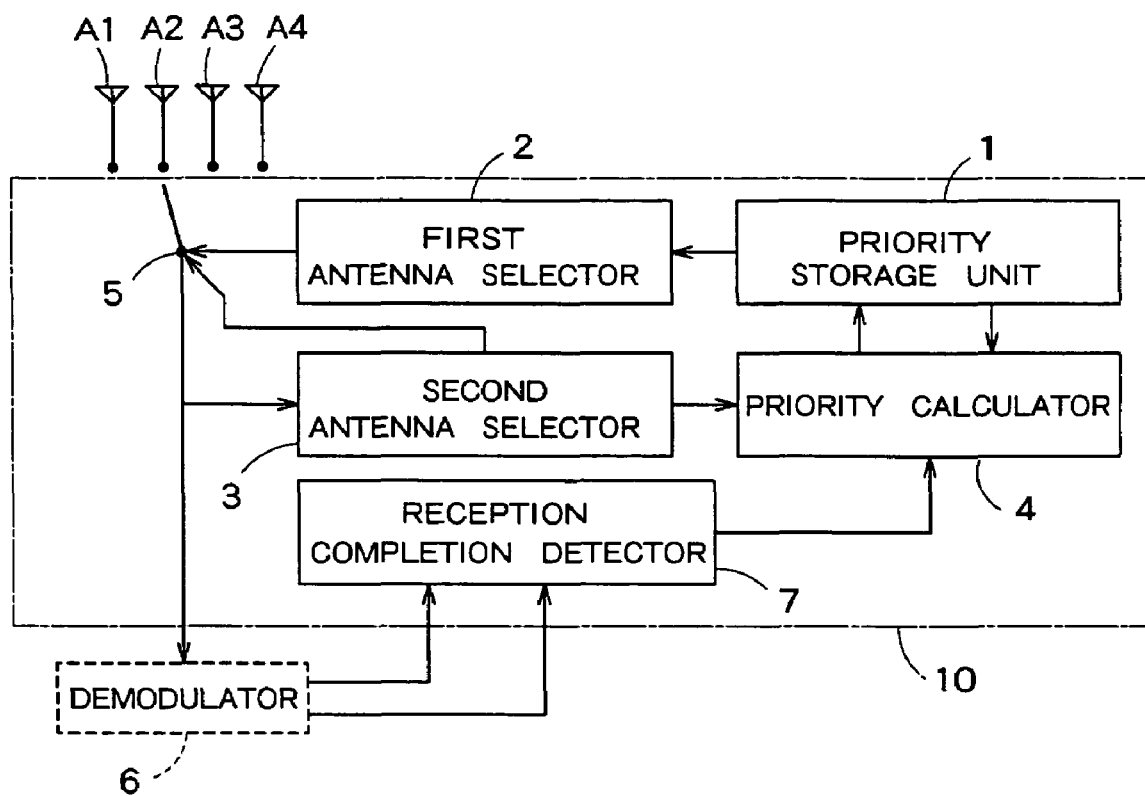
FIG. 10 is a block diagram showing a schematic configuration of the diversity antenna apparatus 10 according to a second embodiment of the present invention.

FIG. 10 is a block diagram showing a schematic configuration of the diversity antenna apparatus 10 according to a second embodiment of the present invention.

The second embodiment is a modification of the first embodiment. Hereinafter, only portions different from those in FIG. 1 according to the first embodiment will be explained. The diversity antenna apparatus 10 shown in FIG. 10 has a reception completion detector 7 that detects a normal reception of a frame of a radio signal from the start to the end, in addition to the configuration shown in FIG. 1. The priority calculator 4 updates the priority data of the antennas A1 to A4 and stores the updated priority data into the priority storage unit 1, only when the reception completion detector 7 detects the whole frame of a radio signal without an error.

The demodulator 6 supplies a signal SIG1 that shows whether a reception is completed, and a signal SIG2 that shows whether the reception is carried out normally, to the reception completion detector 7. The reception completion detector 7 controls the operation of the priority calculator 4 based on these signals SIG1 and SIG2. Specifically, the reception completion detector 7 instructs the priority calculator 4 to update priority data only when a reception is completed, with the reception carried out normally, that is, only when a frame is received without an error from the start to the end.

FIG. 11 is a flowchart showing one example of processing operation carried out by the diversity antenna apparatus 10 shown in FIG. 10. The flowchart shown in FIG. 11 has a processing at step S21 in addition to the steps shown in FIG. 6. Hereinafter, only portions different from those in FIG. 6 will be explained.

At step S21, it is determined whether a frame is received without an error from the start to the end. When the frame cannot be received without an error from the start to the end, the process returns to step S1. When the frame is received without an error from the start to the end, processing at steps S8 and S9 is carried out when a standby antenna is selected, and processing at steps S8 and S10 is carried out when a switch antenna is selected.

FIG. 12 is a table showing a state that the last states of the antennas A1 to A4 change corresponding to the initial states of these antennas. Combinations of states of the antennas in the first to the fourth rows in FIG. 12 indicate that a frame is received without an error from the start to the end. Combinations of states of the antennas in the remaining two rows in FIG. 12 indicate that at least a part of the frame cannot be received. When at least a part of the frame cannot be received, the last states of the antennas become the same as the initial states of the antennas.

As explained above, according to the second embodiment, priority data are updated only when a frame of a radio signal is received without an error from the start to the end. Therefore, it is possible to avoid a risk that signals from parties other than a communication party, i.e., interference signals, give negative influences to priorities.

THIRD EMBODIMENT

A third embodiment is a modification of the second embodiment. According to the third embodiment, when at least a part of a frame cannot be received, priority data are updated.

The diversity antenna apparatus 10 according to the third embodiment has a configuration similar to that shown in FIG. 10, but the operation of the priority calculator 4 is different. The priority calculator 4 according to the third embodiment updates the priority of at least one antenna other than a first priority antenna, when the reception completion detector 7 detects that at least a part of the frame cannot be received. For example, the priority calculator 4 does not change the priority of the first priority antenna, sets the priority of a second priority antenna to the lowest, and raises the priorities of the remaining antennas by one level, respectively.

FIG. 13 is a flowchart showing one example of processing operation carried out by the diversity antenna apparatus 10 according to the third embodiment. The flowchart shown in FIG. 13 has a processing at step S22, in addition to the steps shown in FIG. 11 according to the second embodiment. When it is determined at step S21 that at least a part of the frame cannot be received, priority data of antennas other than a first priority antenna are updated (step S22). Then, the processing returns to step S1.

Figures 14, 15:
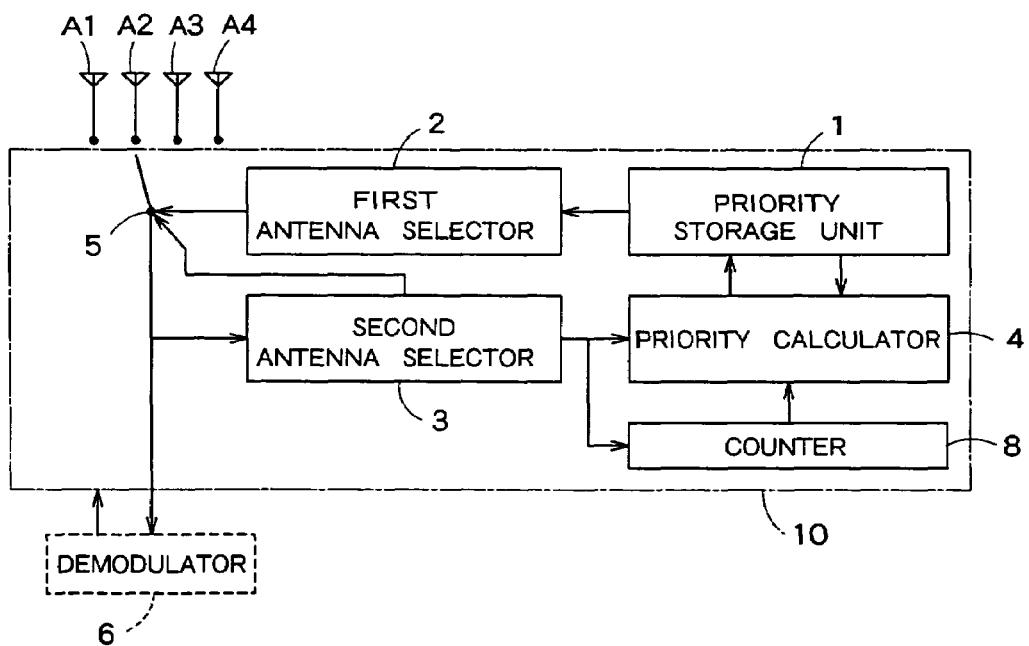
FIG. 14 is a table showing a state that the last states of the antennas A1 to A4 change corresponding to the initial states of these antennas.
FIG. 15 is a block diagram showing a schematic configuration of the diversity antenna apparatus 10 according to the fourth embodiment of the present invention.

FIG. 14 is a table showing a state that the last states of the antennas A1 to A4 change corresponding to the initial states of these antennas. Combinations of states of the antennas in the fifth and the sixth rows in FIG. 14 indicate that at least a part of the frame cannot be received. In this case, priority data of antennas other than a first priority antenna are updated at step S22.

As explained above, according to the third embodiment, when at least a part of the frame cannot be received, priority data of antennas other than a first priority antenna are updated. Because of this, combination of two antennas changes when the second antenna selector 3 selects one antenna afterward. Therefore, it is possible to avoid a situation that a state unable to receive at least a part of the frame continues for a long time.

FOURTH EMBODIMENT

According to a fourth embodiment, a counter is added to the diversity antenna apparatus 10.

FIG. 15 is a block diagram showing a schematic configuration of the diversity antenna apparatus 10 according to the fourth embodiment of the present invention.

The fourth embodiment is a modification of the first embodiment. Hereinafter, only portions different from those in FIG. 1 according to the first embodiment will be explained. The diversity antenna apparatus 10 shown in FIG. 15 has a counter 8 that counts up each time when a first priority antenna is selected and counts down each time when a second priority antenna is selected, in addition to the configuration shown in FIG. 1.

The priority calculator 4 updates priority data of antennas, only when the value of the counter 8 becomes equal to or smaller than a predetermined value. Specifically, when the value of the counter 8 is larger than a predetermined value, the priority calculator 4 does not change priorities. When the value of the counter 8 becomes equal to or smaller than the predetermined value, the priority calculator 4 sets the priority of a first priority antenna to the lowest, and raises priorities of the remaining antennas by one level respectively.

Figures 16, 17:
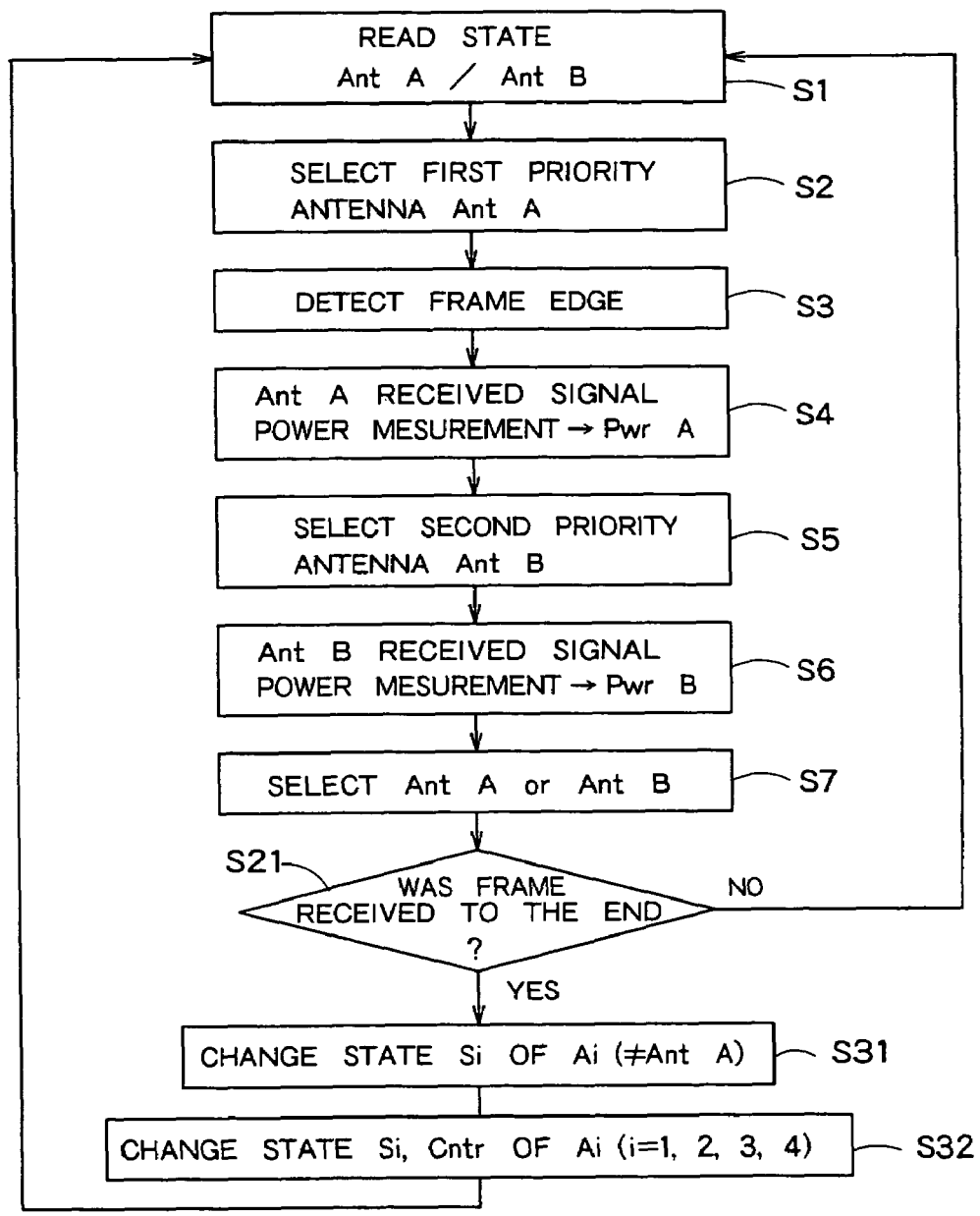
FIG. 16 is a diagram explaining relationship between states and values of a counter.
FIG. 17 is a flowchart showing one example of processing operation carried out by the diversity antenna apparatus 10 according to the fourth embodiment.

As shown in FIG. 16, each time when the priority calculator 4 updates priority data, the value of the counter 8 is also updated. In the example shown in FIG. 16, a first priority antenna is the antenna A3, and value of the counter 8 is 1.

FIG. 17 is a flowchart showing one example of processing operation carried out by the diversity antenna apparatus 10 according to the fourth embodiment. In FIG. 17, processing same as that in FIG. 11 is designated with an identical step number. When it is determined at step S21 that a frame is received without an error from the start to the end, the priority calculator 4 updates priority data of antennas (i.e., a state Si) other than a first priority antenna (step S31). Next, the priority calculator 4 updates the priority of the first priority antenna, and counts up or counts down the counter 8 (step S32).

FIG. 18 is a flowchart showing detailed contents of the processing at step S31 shown in FIG. 17. It is determined whether the second antenna selector 3 selects the standby antenna AntA (step S41). When a determination is made as YES, the priority of the second antenna is set to the lowest, and priorities of the remaining antennas are increased by one level, respectively (step S42).

On the other hand, when the determination is made as NO at step S41, it is determined whether the value of the counter 8 is zero (step S43). When the value of the counter 8 is zero, priorities of antennas other than the first priority antenna are increased by one level respectively (step S44).

FIG. 19 is a flowchart showing one example of the processing at step S32 shown in FIG. 17. It is first determined whether the second antenna selector 3 selects the standby antenna AntA (step S51). When a determination is made as YES, the value of the counter 8 is counted up (step S52).

When a determination is made as NO at step S51, it is determined whether the value of the counter 8 is zero (step S53). When the value of the counter 8 is not zero, the value of the counter 8 is counted down (step S54). When the value of the counter 8 is determined as zero at step S53, the priority of the antenna is set to the lowest (Si=1) (step S55).

FIG. 20 is a table showing a state that the last states of the antennas A1 to A4 change corresponding to the initial states of these antennas. Referring to FIG. 20, in the first row, the initial states of the antennas A1 to A4 are 4, 3, 2, and 1, respectively, and the value of the counter 8 is zero. When the second antenna selector 3 selects the antenna A1, the last states of these antennas become 4, 1, 3 and 2, respectively, and the value of the counter 8 is counted up to 1. In the second row, the initial states of the antennas A1 to A4 are 4, 1, 3 and 2, respectively, and the value of the counter 8 is 1.

When the second antenna selector 3 selects the antenna A3, the last states of these antennas become 4, 1, 3 and 2, respectively, and the value of the counter 8 becomes zero. In the third row, the initial states of the antennas A1 to A4 are 4, 1, 3 and 2, respectively, and the value of the counter 8 is zero. When the second antenna selector 3 selects the antenna A3, the last states of these antennas become 1, 2, 4 and 3, respectively, and the value of the counter 8 becomes zero. In the fourth row, the initial states of the antennas A1 to A4 are 1, 2, 4 and 3, respectively, and the value of the counter 8 is zero. When the second antenna selector 3 selects the antenna A3, the last states of these antennas become 2, 3, 4 and 1, respectively, and the value of the counter 8 becomes 1.

As explained above, according to the fourth embodiment, the counter 8 is provided, and the counter counts number of times of selecting the first priority antenna and the second priority antenna. Therefore, even when a propagation environment changes temporarily due to interference or shadowing, a result of a selection of an antenna is not reflected to the priorities of antennas. Consequently, it is possible to avoid interference or shadowing from giving negative influences to the priorities.

FIFTH EMBODIMENT

A fifth embodiment is a combination of the third and the fourth embodiments.

Figure 21:
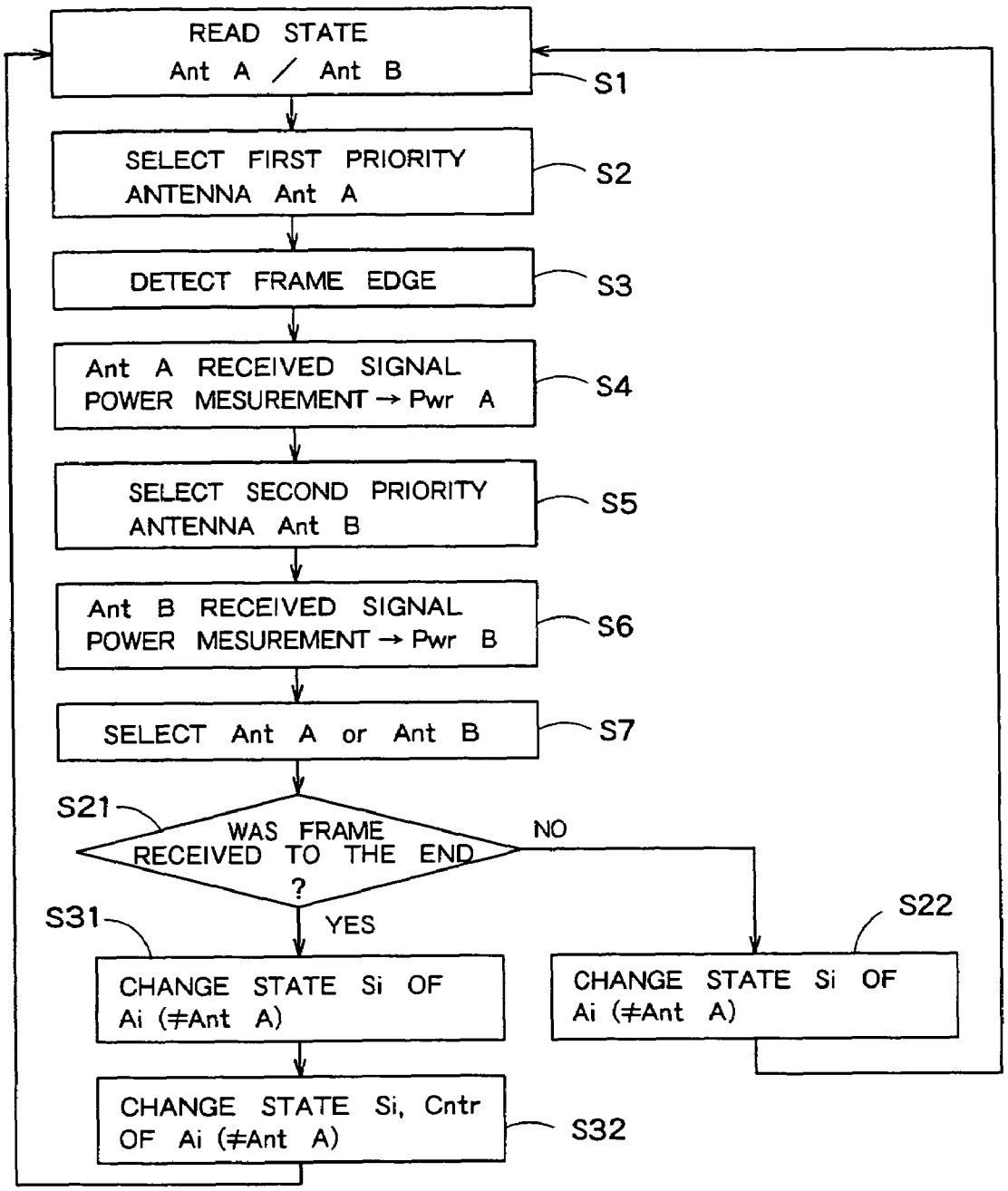
FIG. 21 is a flowchart showing one example of processing operation carried out by the diversity antenna apparatus 10 according to the fifth embodiment.

FIG. 21 is a flowchart showing one example of processing operation carried out by the diversity antenna apparatus 10 according to the fifth embodiment. In the flowchart shown in FIG. 21, when at least a part of a frame cannot be received, priorities of antennas other than that of a first priority antenna are changed (step S22). In other words, the priority of a first priority antenna is not changed, and the priority of a second priority antenna is changed. Then, it is checked again whether the frame can be received without an error from the start to the end. On the other hand, when the frame can be received without an error from the start to the end, priority data of the antennas A1 to A4 are updated, and the value of the counter 8 is also updated (steps S31 and S32).

At step S22, the same processing as that explained with reference to FIG. 7 is carried out. In other words, the priority of a second priority antenna is set the lowest, and priorities of the remaining antennas are increased by one level respectively.

FIG. 22 is a table showing a state that the last states of the antennas A1 to A4 change corresponding to the initial states of these antennas. In the fifth and the six rows, combinations of the initial states of the antennas indicate that at least a part of the frame cannot be received. In this case, the priority of a first priority antenna is not changed, and the priority of a second priority antenna is changed.

As explained above, according to the fifth embodiment, when at least a part of the frame cannot be received, priorities of antennas other than a first priority antenna are changed. Because of this, combination of two antennas which are objects selected by the second antenna selector 3 changes, and it is possible to avoid a situation in which a state unable to receive the frame from the start to the end continues.

SIXTH EMBODIMENT

According to a sixth embodiment, the diversity antenna apparatus 10 detects a wireless communication apparatus that transmits a radio signal.

FIG. 23 is a block diagram showing a schematic configuration of the diversity antenna apparatus 10 according to a sixth embodiment of the present invention.

The sixth embodiment is a modification of the first embodiment. Hereinafter, only portions different from those in FIG. 1 according to the first embodiment are explained. The diversity antenna apparatus 10 shown in FIG. 23 has a transmission source detector 9 that detects a reception of a radio signal from a specific wireless communication apparatus, in addition to the configuration shown in FIG. 1. The priority calculator 4 updates priority data and stores the updated priority data into the priority storage unit 1, only when the transmission source detector 9 receives a radio signal from a specific wireless communication apparatus.

FIG. 24 is one example of a frame configuration of a reception signal that is received by an antenna. As shown in FIG. 24, the frame has various kinds of control information in addition to variable-length data. Control information includes a transmission destination address, a transmitter address, and an error detection signal, for example. Control information is not limited to that shown in FIG. 24.

The frame shown in FIG. 24 is obtained after the signal is demodulated by the demodulator. The transmission source detector 9 detects a transmitter address of the frame from the signal received from the demodulator.

FIG. 25 is a flowchart of one example of processing operation carried out by the diversity antenna apparatus 10 according to the sixth embodiment. The second antenna selector 3 selects either the standby antenna AntA or the switch antenna AntB (step S7). It is determined whether the transmission source detector 9 detects a reception of a radio signal from a specific wireless communication apparatus (step S61). When the transmission source detector 9 does not detect a reception of a radio signal from a specific wireless communication apparatus, the process returns to step S1. When the transmission source detector 9 detects a reception of a radio signal from a specific wireless communication apparatus, it is determined whether the second antenna selector 3 selects a standby antenna (step S8), and priority data are updated (steps S9 and S10).

As explained above, according to the sixth embodiment, priority data of antennas are updated only when a reception of a radio signal from a specific wireless communication is received. Therefore, it is possible to avoid a risk of updating priority data of antennas by error due to a radio signal (for example, an interference wave) other than a radio signal from a specific wireless communication apparatus.

SEVENTH EMBODIMENT

According to a seventh embodiment, the diversity antenna apparatus 10 detects whether a radio signal is addressed to the self.

FIG. 26 is a block diagram showing a schematic configuration of the diversity antenna apparatus 10 according to a seventh embodiment of the present invention. The seventh embodiment shown in FIG. 26 is a modification of the sixth embodiment. Constituent parts common to those shown in FIG. 23 are designated with like reference numerals, and only differences are explained below.

The diversity antenna apparatus 10 shown in FIG. 26 has a transmission destination detector 20 in place of the transmission source detector. The transmission destination detector 20 detects a transmission destination address that is included in a frame demodulated by the demodulator 6, and determines whether the radio signal is addressed to the self.

Figure 27:
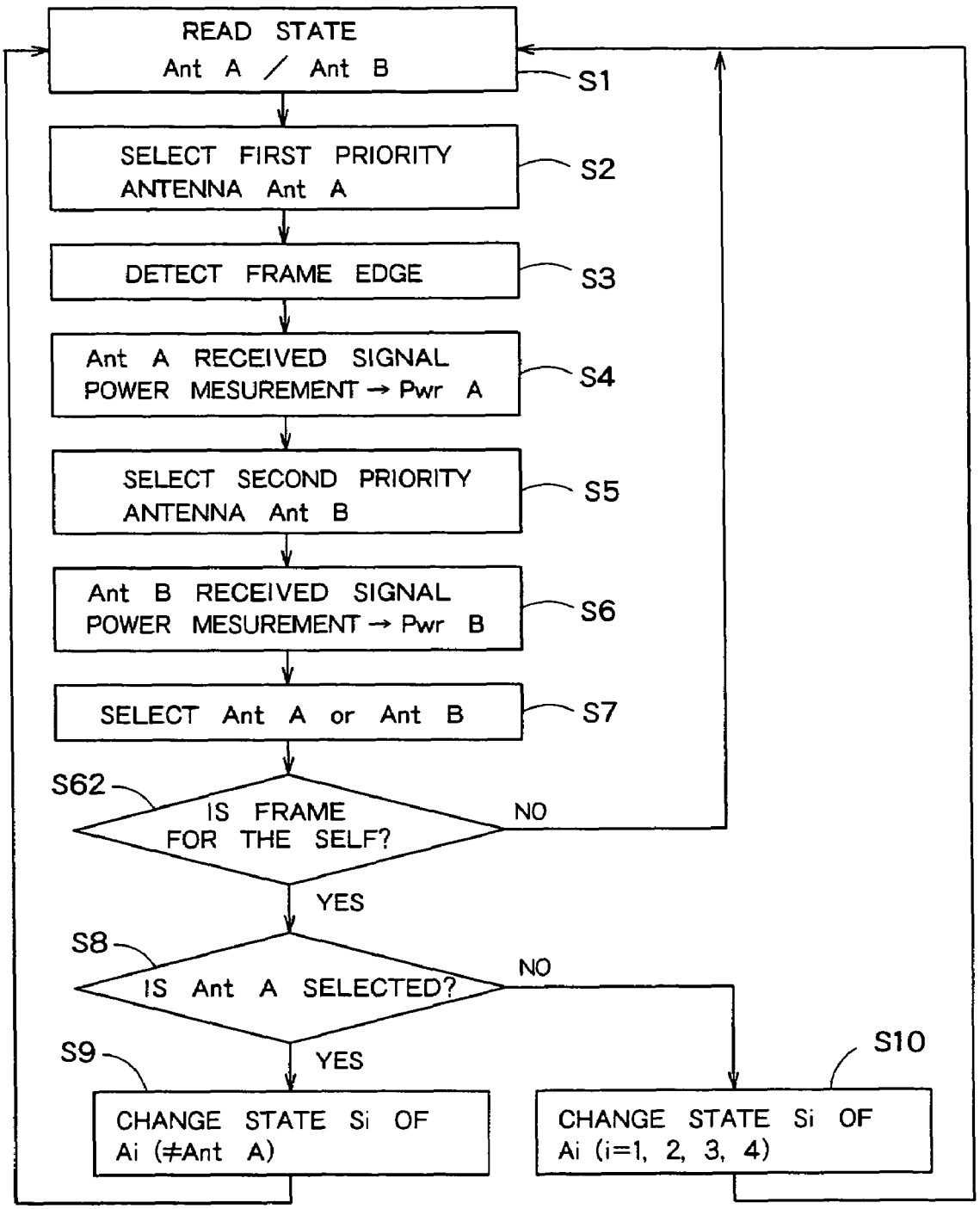
FIG. 27 is a flowchart showing one example of processing operation carried out by the diversity antenna apparatus 10 according to the seventh embodiment.

FIG. 27 is a flowchart showing one example of processing operation carried out by the diversity antenna apparatus 10 according to the seventh embodiment. The second antenna selector 3 selects either the standby antenna AntA or the switch antenna AntB (step S7). Then, it is detected whether the transmission destination detector 20 detects a reception of a radio signal addressed to the self (step S62). When the transmission destination detector 20 does not detect a reception of a radio signal addressed to the self, the process returns to step S1. When the transmission destination detector 20 detects a reception of a radio signal addressed to the self, it is determined whether the second antenna selector 3 selects a standby antenna (step S8), and priority data are updated (steps S9 and S10).

As explained above, according to the sixth embodiment, priority data of antennas are updated only when a radio signal addressed to the self is received. Therefore, it is possible to avoid a risk of updating priority data of antennas by error due to a radio signal (for example, an interference wave) addressed to other wireless communication apparatus.

EIGHTH EMBODIMENT

According to an eighth embodiment, two sets of controllers, each having a four-element antenna, are provided. A diversity antenna apparatus combines radio signals received by the two sets of controllers, and demodulates the combined signal.

Figure 28:
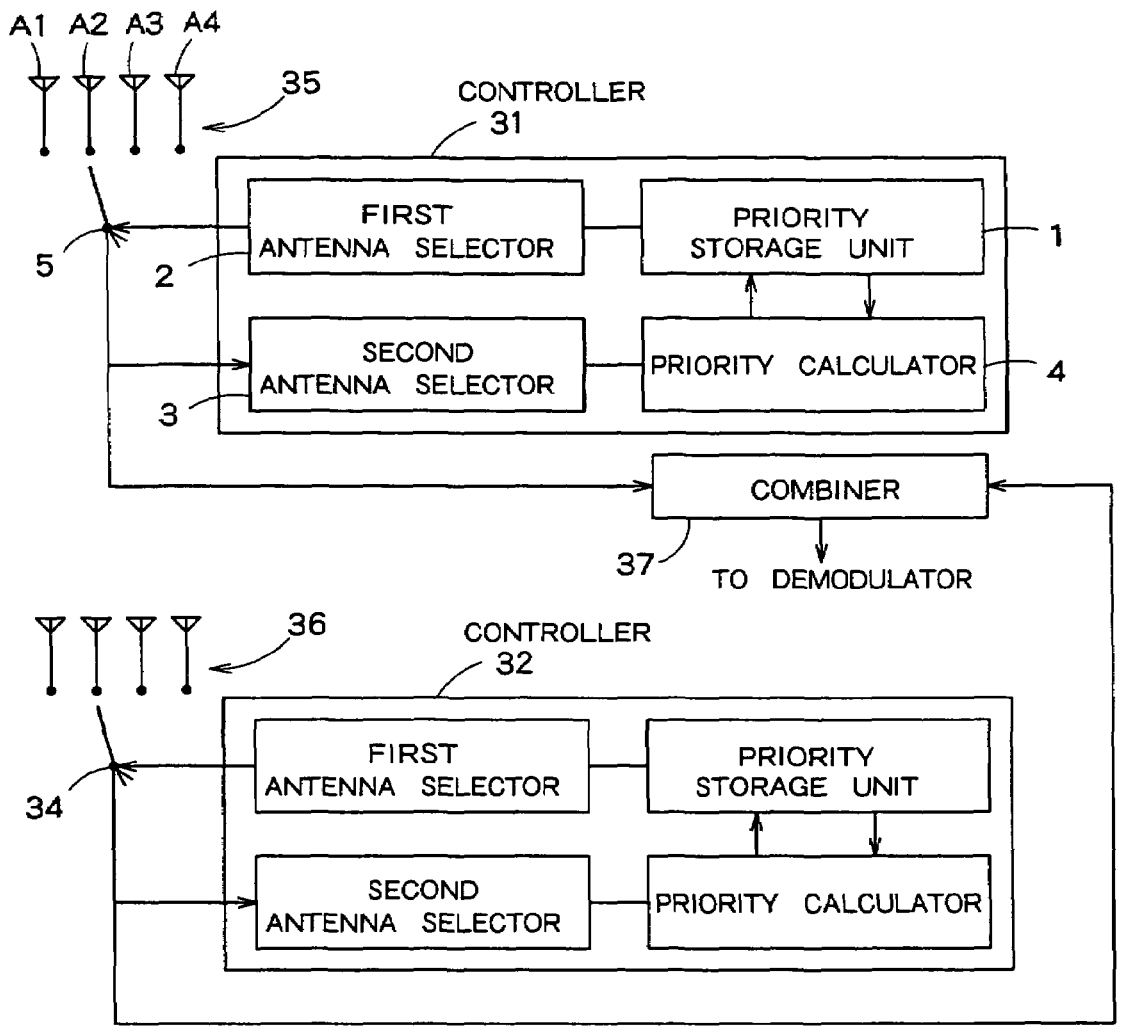
FIG. 28 is a block diagram showing a schematic configuration of the diversity antenna apparatus 10 according to an eighth embodiment of the present invention.

FIG. 28 is a block diagram showing a schematic configuration of the diversity antenna apparatus 10 according to an eighth embodiment of the present invention. The diversity antenna apparatus 10 shown in FIG. 28 has controllers 31 and 32. Each of the controllers 31 and 32 has the first antenna selector 1, the second antenna selector 3, and the priority calculator 4. The controllers 31 and 32 are connected with four-element antennas 35 and 36 via switches 5 and 34 respectively. The diversity antenna apparatus 10 shown in FIG. 28 has a combiner 37 that combines signals received by these antennas. A result of the combined signals output from the combiner 37 is sent to the demodulator 6.

Figure 29:
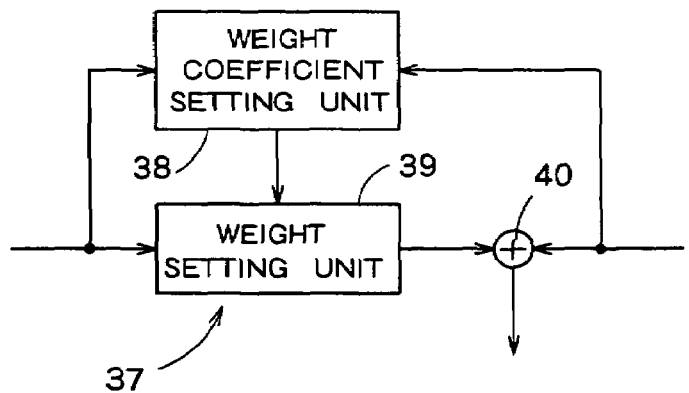
FIG. 29 is a block diagram showing one example of an internal configuration of the combiner 37.

FIG. 29 is a block diagram showing one example of an internal configuration of the combiner 37. The combiner 37 shown in FIG. 29 has a weight coefficient setting unit 38 that detects a difference between phases of the reception signals received by the two antennas, and sets a weight coefficient, a weight setting unit 39 that sets weight to one of the two reception signals of the two antennas using the weight coefficient, and an adder 40 that adds the weighted reception signal and the other reception signal received by the other antenna.

As explained above, according to the eighth embodiment, priorities are set to the antenna elements of the antennas 35 and 36, respectively. A radio signal is received with an optimum antenna element. Reception signals of these antennas 35 and 36 are combined together, and a combined result is demodulated. Therefore, even when a reception sensitivity of a part of the antennas becomes temporarily poor or when antennas receive interference signals, the remaining antennas are little affected.

The present invention is not limited by the embodiments mentioned above, and upon implementations, components can be embodied by making modifications within the scope or spirit of the invention. Various inventions can be achieved by appropriate combinations of the plurality of components disclosed in the above embodiments. For example, some components may be deleted from the all components described in the embodiments, and components from different embodiments may be combined together.

What is claimed is:

1. A diversity antenna apparatus, comprising:
    N (N is 3 or more integer) elements of antennas which receive radio signals;
    a priority storage unit configured to store priority data of said N elements of antennas, the priority storage unit storing the priority data of at least first and second priority antennas;
    a first antenna selector which selects two antennas from among said N elements of antennas based on the priority data;
    a second antenna selector which selects one of the selected two antennas based on a prescribed condition;
    a priority update unit configured to update priority data of said N elements of antennas stored in said priority storage unit based on said antenna selected by said second antenna selector; and
    a reception determination unit configured to determine whether or not a frame of the radio signal has been received without error from the start of the frame to the end thereof,
    wherein said priority update unit sets the priority of the second priority antenna to the lowest, and raises the priorities of the remaining antennas by one level, without changing the priority of the first priority antenna among said N elements of antenna, when said reception determination unit determines that at least a portion of the frame of the radio signal has not been received.

2. The diversity antenna apparatus according to claim 1, further comprising a measurer which counts up when said second antenna selector selects the first priority antenna, and counts down when said second antenna selector selects the second priority antenna,
    wherein said priority update unit updates the priority data of said N elements of antennas only when a value measured by said counter is a prescribed value or less.

3. The diversity antenna apparatus according to claim 2, wherein said priority update unit sets the priority of the first priority antenna to the lowest, and raises the priorities of the remaining antennas by one level, when the value measured by said counter is the prescribed value or less.

4. A diversity antenna apparatus, comprising:
    a plurality of control apparatuses, each having N (N is 3 or more integer) elements of antennas,
    a priority storage unit configured to store priority data of the corresponding N elements of antennas, the priority storage unit storing the priority data of at least first and second priority antennas;
    a first antenna selector which selects two antennas from among said N elements of antennas based on the priority data;
    a second antenna selector which selects either of the selected two antennas based on a prescribed condition;
    a priority update unit which updates the priority data of said N elements of antennas stored in said priority storage unit based on said antenna selected by said second antenna selector; and
    a reception determination unit configured to determine whether or not a frame of the radio signal has been received without error from the start of the frame to the end thereof,
    wherein said priority update unit sets the priority of the second priority antenna to the lowest, and raises the priorities of the remaining antennas by one level, without changing the priority of the first priority antenna among said N elements of antenna, when said reception determination unit determines that at least a portion of the frame of the radio signal has not been received.

5. The diversity antenna apparatus according to claim 4, further comprising a measurer which counts up when said second antenna selector selects the first priority antenna, and counts down when the second priority antenna is selected,
wherein said priority update unit updates priority data of said N elements of antennas only when a value measured by said counter is a prescribed value or less.

* * * * *